United States Patent Office 3,676,107
Patented July 11, 1972

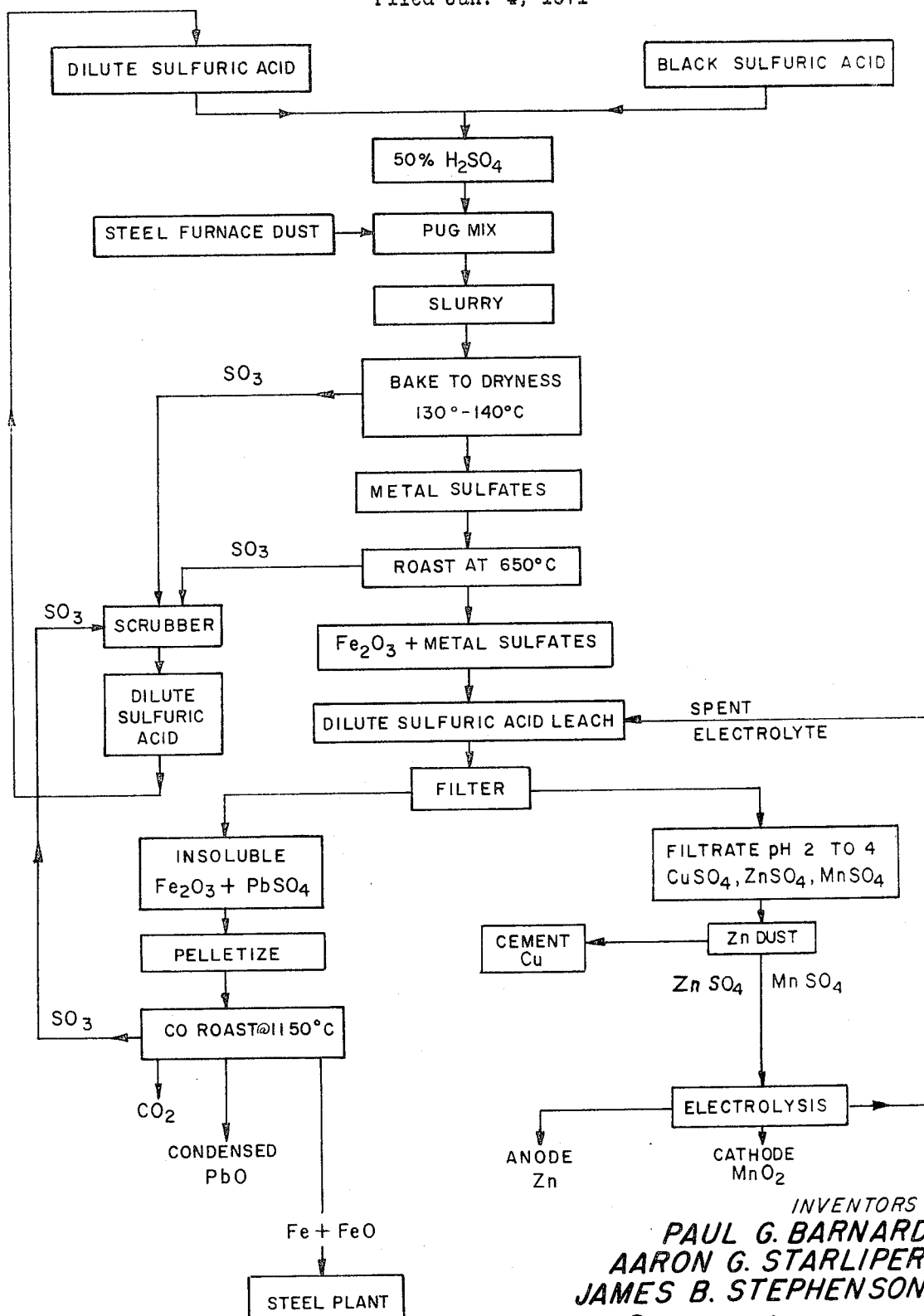

3,676,107
REFINING IRON-BEARING WASTES
Paul G. Barnard, Aaron G. Starliper, and James B. Stephenson, Rolla, Mo., assignors to the United States of America as represented by the Secretary of the Interior
Filed Jan. 4, 1971, Ser. No. 103,559
Int. Cl. C22b 3/00
U.S. Cl. 75—109   4 Claims

ABSTRACT OF THE DISCLOSURE

Iron-bearing wastes, such as steelmaking dusts, are treated with sulfuric acid to form sulfates of the iron, copper, lead, manganese and zinc in the dust. The sulfated material is roasted at a temperature of about 550 to 700° C. to convert the iron sulfate to iron oxide and is then leached with water to remove the soluble copper, zinc and manganese sulfates.

The lead is removed from the iron-bearing residue by roasting in a reducing atmosphere whereby the lead sulfate is decomposed, the decomposition products volatilized and the lead collected in the form of lead oxide. The iron-rich residue is then reduced to a metallized product suitable for recycle to a steelmaking plant.

---

This invention relates to the extraction and recovery of copper, lead, manganese and zinc from iron-bearing wastes such as steelmaking dusts. The dusts cannot be recycled in the steel plant because of the deleterious effects of the copper, lead, and zinc, representing contents greater than about 0.1 percent of each. Removal of these impurities would permit utilization of the resulting iron-rich material by recycling. These steelmaking dusts have a high potential as a source for iron since many of them contain as much as 50 percent iron and are collected as wastes in quantities of about 4 million tons per year.

Copper, in combined and free oxide form, is present in quantities greater than 0.1 percent in many of the steelmaking dusts collected from electric and open-hearth furnaces. Although generally lower in copper content, some steelmaking dusts collected from basic-oxygen furnaces also contain copper in excess of 0.1 percent. This element is particularly difficult to remove from the dusts and is not removed from steel during refining.

It has now been found, according to the process of the invention, that copper, as well as lead, manganese and zinc, can be recovered from steelmaking dusts by treating the dusts with sulfuric acid to form sulfates of the metals, roasting of the sulfated product to convert the iron sulfate to insoluble oxides and subsequently leaching to extract the soluble copper sulfate, as well as manganese and zinc sulfates. The iron-bearing residue contains the insoluble iron oxides, as well as lead sulfate. This residue is roasted in a reducing atmohspere whereby the lead sulfate is decomposed, volatilized and collected in the form of lead oxide. The iron-rich residue is further reduced to a metallized product which may contain iron plus a mixture of iron oxides, depending on the degree of reduction desired. After complete metallization this product, containing about 80 percent iron, is suitable for recycling to a plant where the iron content is recovered in the steel products.

The essential steps of the process of the invention will now be described in detail. These steps are also shown in the figure, which is a flow diagram of the preferred embodiment of process of the invention.

The starting material is an iron-containing waste material, which also contains copper as an impurity. Typical of such materials, and ones found to be particularly amenable to the process of the invention, are steel furnace dusts that are collected in pollution abatement systems during melting and refining operations in steel plants. General range of composition varies from about 1 to 55 percent iron, near 0 to 1.5 percent copper, 0 to 10 percent lead, 0 to 10 percent manganese, 1 to 60 percent zinc, with the remainder consisting largely of other metallic oxides.

The iron-containing waste material is initially treated with sulfuric acid to convert the metal constituents to sulfates. Optimum amounts and concentrations of the acid, as well as other process variables described below, may vary considerably with the type of waste material treated, as well as the type of product desired, and are best determined experimentally. The concentration of the acid will usually range from about 20 to 80 percent, preferably about 50 percent, with the weight ratio of acid to dust ranging from about 1:1 to 3:1, preferably about 1:1, when the waste material is a steel furnace dust of the type described above. Black sulfuric acid usually gives satisfactory results and is more economical since it is a byproduct of some smelters and has a low market value.

A slurry of the acid and dust is formed by mixing of the materials in any conventional type of apparatus designed to provide for adequate mixing and for subsequent heating of the mixture. Such apparatus may consist of a pugmill or similar device for blending and mixing. The slurry is then baked to dryness at a temperature of about 100 to 300° C., preferably about 130° C., to convert all the metallic oxides to sulfates according to the following equation.

$$MO + H_2SO_4 \xrightarrow{\Delta} MSO_4 + H_2O \uparrow \qquad (1)$$

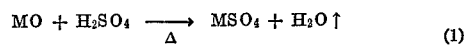

where M represents such metals as Fe, Zn, Mn, Pb, Cu, etc.

The sulfated material is then roasted in air at a temperature of about 500 to 700° C., preferably about 650° C., for a period of about 4 to 8 hrs. to convert all the iron sulfate to iron oxide according to the following equation:

$$Fe_2(SO_4)_3 \xrightarrow{\Delta} Fe_2O_3 + 3SO_3 \uparrow \qquad (2)$$

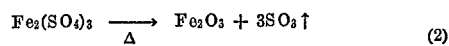

The SO₃ is collected in a scrubber and is combined with water to form dilute sulfuric acid, part of which may be used in leaching copper, zinc and manganese sulfates, and possibly calcium sulfate, as described below. The remaining acid is used to form the acidulated slurry with fresh furnace dust.

Following roasting, the material is leached in dilute sulfuric acid solution to dissolve the sulfates of copper, zinc, manganese and calcium, if present, leaving the iron oxide and lead sulfate as residue, according to the following equation:

$$Fe_2O_3 + PbSO_4 + MSO_{4(s)} + H_2O \xrightarrow{H_2SO_4}$$
$$Fe_2O_3 \downarrow + PbSO_4 \downarrow + MSO_{4(l)} + H_2O + H_2SO_4 \qquad (3)$$

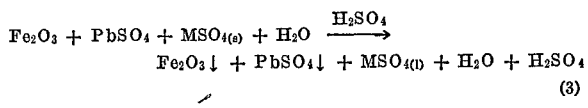

Concentration of the sulfuric acid leach solution will range from about 1 to 10 percent, and the weight ratio of leach solution to roasted material will range from about 1:1 to 5:1, preferably about 1.5:1.

The residue is filtered to a degree of dryness appropriate for pelletizing, formed into pellets suitably of a size of about ¼ to ½ inch in diameter and then roasted in a reducing atmosphere with an excess gas flow. The lead sulfate is thereby dissociated to lead oxide and SO₃, the former being volatilized as formed and separated from the off-gases. Simultaneously, a portion of the iron oxide is reduced to metallic iron. Thus, the reducing gas serves to both reduce the iron oxide and to sweep out the volatile reaction products, i.e., PbO and $SO_3$. The reaction is illustrated by the following equation, in which the reducing gas is CO:

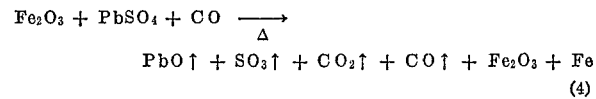

(4)

Other reducing gases, such as hydrogen or a mixture of CO and hydrogen, may also be used. A particularly suitable reducing gas, for reasons of economy, is producer gas comprising predominantly a mixture of CO and $H_2$. In addition, the reducing gas may be produced by initial incorporation of carbon, preferably as coke or coke breeze, in the residue prior to pelletizing, subsequent roasting in air producing CO. Generally, amounts of carbon from about 10 to 40 weight percent are satisfactory.

For efficient reduction of the $Fe_2O_3$, as well as removal of PbO, it is desirable to utilize a flow of an excess of reducing gas. The amount of reducing gas employed will usually range from about 1 to 10 cubic feet per pound of $Fe_2O_3$–$PbSO_4$ residue, with the flow rate ranging from about 0.1 to 0.5 cubic ft./min. The roasting may be carried out in any conventional apparatus, such as a rotary kiln or multiple hearth furnace, with means for supplying the reducing gas in the desired amount and for providing efficient contact of the gas with the pellets. Usually, simply passing the reducing gas through a bed of the pellets gives satisfactory results. Suitable temperatures for the roasting will range from about 800 to 1200° C., with a temperature of about 1150° C. usually being optimum. PbO and $SO_3$ products are removed and collected by means of a wet scrubber or similar device.

It has been found that as much as 99.9 percent metallization of the iron oxide residue can be obtained by the above reaction. However, if this degree of metallization is not attained an additional step of reduction of iron oxide to metallic iron, may be desired. This consists of further roasting of the $Fe_2O_3$-Fe product at similar temperatures. The resulting pellets can then be recycled to a steel plant where the iron content is recovered in steel products.

The filtrate from the leaching step (Equation 3) contains mostly sulfates of copper, zinc and manganese and will usually have a pH in the range of about 2 to 4. If the pH is outside this range, it may readily be adjusted by addition of acid such as sulfuric or base such as soda ash. Recovery of the metals from this solution is by conventional means, as described below. Copper is conveniently recovered by adding sufficient zinc dust to the solution for complete cementation of the copper, according to the following equation:

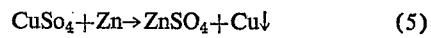
(5)

Zinc and manganese are then recovered by conventional electrolysis procedures in which zinc is recovered on the cathode and manganese as $MnO_2$ on the anode. The electrolysis is generally carried out in an electrolytic cell using aluminum as the cathode and lead-1% silver as the anode, with a current density of about 50–80 amperes/ square foot.

As an alternative to the above procedure, copper can be recovered from the filtrate of Equation 3 by other conventional extration methods such as ion exchange or controlled-potential electrolysis. Generally, however, where zinc sulfate is present in the filtrate, it is preferable to employ zinc dust for recovering the copper and if excess zinc is added, it can be recovered with the zinc present in the sulfate solution.

Application of the process of the invention has been found effective for removal of as much as 98 percent of the copper from steelmaking dusts containing copper, lead and zinc impurities, where the copper content was about 0.25 percent. Where the iron-rich (magnetic residue) waste was from a zinc-retort plant and contained about 4.4 percent copper, a copper recovery of over 94 percent was obtained.

We claim:
1. A process for refining iron-bearing steelmaking dusts for recycling comprising (1) forming a slurry of the dust in sulfuric acid solution of a concentration of about 20 to 80 percent, (2) baking the slurry to dryness at a temperature of about 100 to 300° C. to convert the metallic constituents to sulfates, (3) roasting the sulfated material in air at a temperature of about 500 to 700° C. for a period of about 4 to 8 hours to convert the iron sulfate to iron oxide, (4) leaching the roasted material in sulfuric acid of a concentration of about 1 to 10 percent to dissolve any copper sulfate and leave the iron oxide as a residue, (5) separating the resulting copper sulfate-containing solution from the iron oxide residue, (6) pelletizing the residue and (7) roasting the pellets at a temperature of about 800 to 1200° C. in a flow of reducing gas sufficient to decompose any lead sulfate to lead oxide and volatilize the lead oxide, while simultaneously reducing the iron oxide to a metallic iron content suitable for recycle to a steelmaking operation.

2. The process of claim 1 in which the reducing gas is carbon monoxide, hydrogen or a mixture of the two.

3. The process of claim 1 in which the iron-bearing dust also contains zinc, manganese, or both, as impurities, the zinc and manganese are converted to sulfates in step (2) and are dissolved in step (4).

4. The process of claim 3 in which copper is recovered from the solution of copper, zinc and manganese sulfates by cementation with zinc dust.

References Cited
UNITED STATES PATENTS

| | | | |
|---|---|---|---|
| 2,121,887 | 6/1938 | Sessions et al. | 75—115 |
| 1,154,602 | 9/1915 | Best | 75—115 X |
| 3,164,463 | 1/1965 | Graham et al. | 75—121 X |

HERBERT T. CARTER, Primary Examiner

U.S. Cl. X.R.

75—115, 117, 121; 23—146, 125, 126, 127